United States Patent [19]

Sekido et al.

[11] Patent Number: 5,310,777
[45] Date of Patent: May 10, 1994

[54] RUBBER COMPOSITION HAVING A LARGE DAMPING CAPACITY

[75] Inventors: Fumio Sekido; Katsumi Terakawa, both of Akashi, Japan

[73] Assignee: Sumitomo Rubber Industries, Ltd., Hyogo, Japan

[21] Appl. No.: 700,608

[22] Filed: May 15, 1991

[30] Foreign Application Priority Data

May 15, 1990 [JP] Japan ................... 2-124666

[51] Int. Cl.$^5$ ............................. C08K 3/04
[52] U.S. Cl. .................. 524/496; 524/496; 524/526
[58] Field of Search ............. 524/495, 496, 526

[56] References Cited

U.S. PATENT DOCUMENTS

| | | | |
|---|---|---|---|
| 4,362,840 | 12/1982 | Tabar et al. | 524/526 |
| 4,599,370 | 7/1986 | Grossman et al. | 524/496 |
| 4,642,202 | 2/1987 | Railsback | 524/495 |
| 4,775,778 | 10/1988 | van Konynenburg et al. | 524/495 |
| 4,918,127 | 4/1990 | Adur et al. | 524/526 |

FOREIGN PATENT DOCUMENTS 0049175  4/1982  European Pat. Off. .

OTHER PUBLICATIONS

Derwent Publication Ltd., London, GB; Class A12, AN 82-78159E and JP-A-57 128 737 (Bridgestone Tire) Aug. 10, 1982, abstract only.
Foreign Search Report.

*Primary Examiner*—Paul R. Michl
*Assistant Examiner*—Edward Cain
*Attorney, Agent, or Firm*—Birch, Stewart, Kolasch & Birch

[57] ABSTRACT

Disclosed is rubber composition which can preferably be used for the components requires high damping capacity such as rubber dampers for use in the structures, public works, vehicles, oversize powered machines, and heavy weight structures; and general purpose dumpers for use in sound products, a variety of meters; the components of the vehicles, and the like in the case of a little amount of use. The rubber composition is characterized by having a complex shear elastic modulus of 1-20 kg/cm$^2$ and a Tan$\delta$ of 0.40-1.5 at 30° C. under a frequency of 0.5 Hz±50% comprising:

a) 100 parts by weight of polyisobutylene;
b) x parts by weight of filler for use in rubber;
c) y parts by weight of carbon black having an iodine adsorption of 20-120 mg/g;

wherein the value x and y satisfy the relation that:
$x \leq 450$, $y \leq 150$, and
$x + y \geq 100$.

9 Claims, 1 Drawing Sheet

RUBBER COMPOSITION HAVING A LARGE DAMPING CAPACITY

FIELD OF THE INVENTION

The present invention relates to rubber composition having a large damping capacity.

BACKGROUND OF THE INVENTION

Recently, laminated vibrationproofing structures have been widely used as vibration isolators for constructive structures (e.g. buildings). The laminated vibrationproofing structures are introduced between the structures and the foundation to decrease transmission of earthquake vibration energy to the structures. A wide variety of shapes of these laminated vibrationproofing structures have been proposed. Rubber composition having a large damping capacity have been used as components of laminated vibration proofing structures.

In order to enhance the damping capacity, the rubber composition contains carbon black in a large amount. Processing characteristics and excellent elongation are also imparted by addition of a large amount of softening agent to the rubber composition. Although these conventional rubber compositions have a good damping capacity, a rubber composition having a constant damping capacity in a wide range of temperatures (e.g., $-10°$ to $+30°$ C.) and possessing excellent aging resistance is desired.

SUMMARY OF THE INVENTION

An object of the present invention is to provide a rubber composition which can preferably be used for components requiring a high damping capacity, such as rubber dampers for use in structures, public works, vehicles, oversize powered machines and heavy weight structures; and including general purpose dumpers for use in sound products, a variety of meters, components of vehicles, and the like, in the case of a little amount of use. Accordingly, rubber composition of the present invention, has a large damping capacity, a decreased variation of elastic modulus and a damping capacity at a wide range of temperature (e.g., It does not crystallize at low temperature.), and an excellent aging resistance. Thus, the present invention provides a rubber composition having a complex shear elastic modulus (Hereinafter, the complex shear elastic modulus is referred to as $G^*$.) of 1–20 kg/cm² and a Tan$\delta$ of 0.40–1.5 at 30° C. under a frequency of 0.5 Hz$\pm$50% comprising:

a) 100 parts by weight of polyisobutylene;
b) x parts by weight of a filler for use in rubber; and
c) y parts by weight of carbon black having an iodine adsorption of 20–120 mg/g;

wherein the value x and y satisfy the relation;
$x \leq 450$, $y \leq 150$, and
$x + y \geq 100$.

The present invention will become more fully understood from the detailed description given hereinbelow and the accompanying drawings which are given by way of illustration only, and thus, are not limitative of the present invention, and wherein:

DETAILED DESCRIPTION OF THE INVENTION

Figure 1:
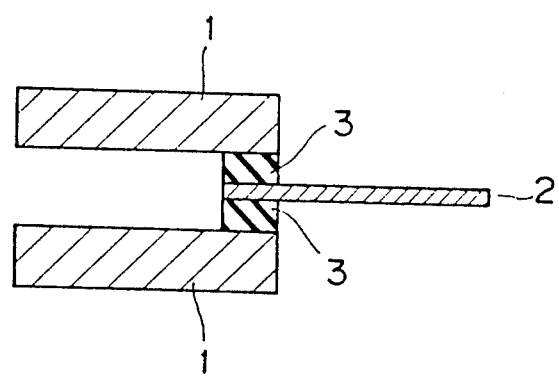
FIG. 1 is a sectional view of a sample which is prepared for measurement of $G^*$ and Tan$\delta$ of the rubber composition of the present invention.

The rubber component useful in the present invention is polyisobutylene. The other rubber components such as butyl rubber, halogenated butyl rubber, natural rubber, polyisoprene, styrene-butadiene rubber, acrylonitrile-butadiene rubber, chlorosulfonated polyethylene rubber, ethylene propylene rubber, chloroprene rubber, butadiene rubber, polynorbornane rubber can also be blended into the rubber composition of the present invention. Suitable polyisobutylene employed in the present invention has a molecular weight of not less than 300,000, preferably not less than 1,000,000, as obtained from Flory equation for melt viscosity. In the present invention, the wording "molecular weight" means "the Flory viscosity average molecular weight". If the molecular weight is less than 300,000, the damping capacity of the resulting rubber composition may deteriorate due to the difficulty of mixing a large amount of carbon black and fillers ined the composition.

The carbon black employed in the present invention has an iodine adsorption of 20–120 mg/g as measured by the method described in JIS K6221. If the iodine adsorption is less than 20 mg/g, the damping capacity of the resulting rubber composition may deteriorate. If the iodine adsorption is greater than 120 mg/g. dispersion during the kneading process and processing characteristics in the successive processes (e.g. extrusion, calendering) may deteriorate.

The fillers employed in the present invention may be conventional fillers, used in rubber composition in the art. Examples of suitable fillers include but are not limited to finely powdered talc, hard clay, surface treated calcium carbonate, calcium silicate, silica, and chinese white.

The amount of the carbon black incorporated in the rubber composition of the present invention is not more than 150 parts by weight based on the 100 parts by weight of polyisobutylene. The amount of the fillers incorporated in the rubber composition of the present invention is not more than 450 parts by weight based on the 100 parts by weight of polyisobutylene. Furthermore, the combined amount of the carbon black and the fillers must be not less than 100 parts by weight. If the combined amount of the carbon black and the filler is less than 100 parts by weight, the damping capacity of the resulting rubber composition may deteriorate. If greater than 150 parts by weight of the carbon black or greater than 450 parts by weight of the filler is blended, the processing characteristics of the resulting rubber composition may deteriorate.

Other conventional additives such as softening agents, tackifiers, oligomers, anti-aging agents, and processing aids may optionally be incorporated into the rubber composition of the present invention. Preferably, these additives are incorporated into the rubber composition of the present invention in amounts of not more than 120 parts by weight based on 100 parts by weight of the rubber components.

Since polyisobutylene has little double bonds in its main chain, it is not vulcanized. However, in the rubber composition of the present invention, other rubber components having double bonds in their main chain may be blended therein. Then, the rubber composition of the present invention containing rubber components other than polyisobutylene may be vulcanized by the addition of vulcanizing agents or vulcanizing accelerators.

The rubber composition of the present invention must have a $G^*$ of 1–20 kg/cm$^2$ and a Tanδ of 0.40–1.5 at 30° C. under a frequency of 0.5 Hz±50%. Tanδ is a physical property which represents the damping capacity of the material. Preferably, $G^*$ of the rubber-like viscoelastic material employed in the present invention is 1–20 kg/cm$^2$, more preferably 3–12 kg/cm$^2$. A material having $G^*$ less than 1 kg/cm$^2$ is inferior in damping capacity. Since the spring constant in the shear direction of the laminated rubber structures is defined by $G^*$ and the height in the vertical direction of the laminated rubber structures, if $G^*$ is greater than 20 kg/cm$^2$ the height of the laminated rubber structures becomes large, producing buckling without difficult. Thus, material having $G^*$ of not more than 20 kg/cm$^2$ is preferred.

The procedure for the measurement of $G^*$ and Tanδ of the present invention is as follows. First, in the rubber composition 3 which is held between metal plates 1, 1, another metal plate 2 is introduced as shown in FIG. 1. The metal plates 1, 1 are then fixed and the metal plate 2 is moved in the horizontal direction at a frequency of 0.5 Hz to obtain the value of $G^*$ and Tanδ.

The shear deformation is defined by the following formula:

Shear deformation (%) = $l_1/t_0 \times 100$.

$l_1$: Horizontal distance in which the metal plate 2 is moved.
$t_0$: Thickness of the rubber composition 3.

EXAMPLES

The following no-limiting examples further illustrate the present invention.

EXAMPLES 1–4 AND COMPARATIVE EXAMPLES 1–5

The rubber compositions were prepared according to the formulation included in the following Table 1.

The physical properties of the resulting rubber compositions are reported in Table 2. As the physical properties. $G^*$ and Tanδ both at 30° C. and at −10° C. $G^*$ at −10° C. where the rubber sample had been aged for 16 hours at −10° C. as well as a rate of change of the Mooney viscosity before and after a aging for 168 hours at 100° C. were measured.

Example 1 and Comparative Examples 1 and 2 show that the polyisobutylene rubber composition of the present invention has a decreased change of $G^*$ in the range of temperature between 30° C. and −10° C. This indicates that the rubber composition of the present invention does not crystallize under the abovenoted conditions. As is apparent from Comparative Examples 3 and 5 the damping capacity deteriorates when the amounts carbon black and fillers are decreased. Comparative Example 4 shows that the rubber compositions containing too much of carbon black and fillers exhibit a deterioration processing characteristics such as kneading, carbon dispersion, and calendering. Furthermore, the rubber composition of the present invention exhibits a decreased change in the Mooney viscosity before and after aging for 168 hours at 100° C. This indicates that the rubber composition of the present invention has an excellent aging resistance.

TABLE 1

| Components | E[a]1 | C[b]1 | C2 | E2 | E3 | E4 | C3 | C4 | C5 |
|---|---|---|---|---|---|---|---|---|---|
| PIB[1] | 100 | — | — | 100 | 100 | 100 | 100 | 100 | 100 |
| NR[2] | — | 100 | — | — | — | — | — | — | — |
| SBR[2] | — | — | 100 | — | — | — | — | — | — |
| CB26[4] | 70 | 70 | 70 | — | — | — | — | 180 | — |
| CH110[5] | — | — | — | 70 | 50 | 120 | 30 | — | 60 |
| PT[6] | 85 | 85 | 85 | 85 | 405 | 215 | 40 | 200 | 20 |
| SA[7] | 22 | 22 | 22 | 29 | 58 | 56 | 18 | 65 | 20 |
| StA[8] | 2 | 2 | 2 | 2 | 2 | 2 | 2 | 2 | 2 |
| TiC[9] | 1.2 | 1.2 | 1.2 | 1.2 | 8 | 3 | 0.7 | 3 | — |

[a]Example
[b]Comparative Example
[1]Polyisobutylene
[2]Natural rubber
[3]Styrene-butadiene rubber
[4]Carbon black having an iodine adsorption of 26 mg/g
[5]Carbon black (LS-ISAF) having an iodine adsorption of 110 mg/g
[6]Powdered talc ("Mistron Vapor", Sierra Talc co., average particle size 3 μm, maximum particle size 6 μm)
[7]Softening agent
[8]Stearic acid
[9]Titanium coupler

TABLE 2

| Physical Properties | E[a]1 | C[b]1 | C2 | E2 | E3 | E4 | C3 | C4 | C5 |
|---|---|---|---|---|---|---|---|---|---|
| $G^*30$[1] | 4 | 4.2 | 5 | 3.8 | 6.7 | 7.2 | 2.1 | — | 2.9 |
| $G^* -10$[2] | 14.7 | 16.0 | 25 | 13.6 | 23.4 | 28 | — | — | — |
| $G^* -10/G^*30$ | 3.7 | 3.8 | 5 | 3.6 | 3.5 | 3.9 | — | — | — |
| $G^*A$[3] | 14.1 | 55 | 25.2 | — | — | — | — | — | — |
| Tanδ30[4] | 0.54 | 0.59 | 0.69 | 0.58 | 1.3 | 1.0 | 0.3 | — | 0.34 |
| Tanδ−10[5] | 0.83 | 0.82 | 0.98 | 0.89 | 1.3 | 1.1 | — | — | — |

TABLE 2-continued

| Physical Properties | E[a]1 | C[b]1 | C2 | E2 | E3 | E4 | C3 | C4 | C5 |
| --- | --- | --- | --- | --- | --- | --- | --- | --- | --- |
| CMV[6] | +5% | −85% | +40% | — | — | — | — | — | — |

[a]Example
[b]Comparative Example
[1]G* (Kg/cm$^2$) measured at 30° C.
[2]G* (Kg/cm$^2$) measured at −10° C.
[3]G* (Kg/cm$^2$) measured at −10° C. where the rubber sample had been aged for 16 hours at −10° C.
[4]Tan δ measured at 30° C.
[5]Tan δ measured at −10° C.
[6]Rate of change of the Mooney viscosity before and after an aging for 168 hours at 100° C.

What is claimed is:

1. A rubber composition having a complex shear elastic modulus of 1–20 kg/cm$^2$ and a Tanδ of 0.40–1.5 at 30° C. under a frequency of 0.5 Hz±50% comprising:
   a) 100 parts by weight of unvulcanized polyisobutylene;
   b) x parts by weight of a filler; and
   c) y parts by weight of carbon black having an iodine adsorption of 20–120 mg/g;
wherein the value x and y satisfy the relation that:
   $x \leq 450$, $y \leq 150$, and
   $x + y \geq 100$.

2. The rubber composition according to claim 1 wherein said polyisobutylene has a molecular weight not less than 300,000.

3. The rubber composition according to claim 1 wherein said polyisobutylene has a molecular weight not less than 1,000,000.

4. The rubber composition according to claim 1 further comprising at least one rubber components selected form the group consisting of butyl rubber, halogenated butyl rubber natural rubber, polyisoprene, styrene-butadiene rubber and, acrylonitrile-butadiene rubber, chlorosulfonated polyethylene rubber, ethylene propylene rubber, chloroprene rubber, butadiene rubber, polynorbornane rubber.

5. The rubber composition according to claim 4 which is vulcanized by the addition of vulcanizing agents or vulcanizing accelerators.

6. The rubber composition of claim 1, wherein the filler is selected from the group consisting of finely powdered talc, hard clay, surface treated calcium carbonate, calcium silicate, silica, and chinese white.

7. The rubber composition of claim 1, wherein the carbon black is present in an amount of not more than 150 parts by weight based on the 100 parts by weight of the polyisobutylene.

8. The rubber composition of claim 7, wherein the filler is present in an amount of not more than 450 parts by weight based on 100 parts by weight of the polyisobutylene.

9. The rubber composition of claim 8, wherein the combined amount of the carbon black and the filler is not less than 100 parts by weight.

* * * * *